UNITED STATES PATENT OFFICE.

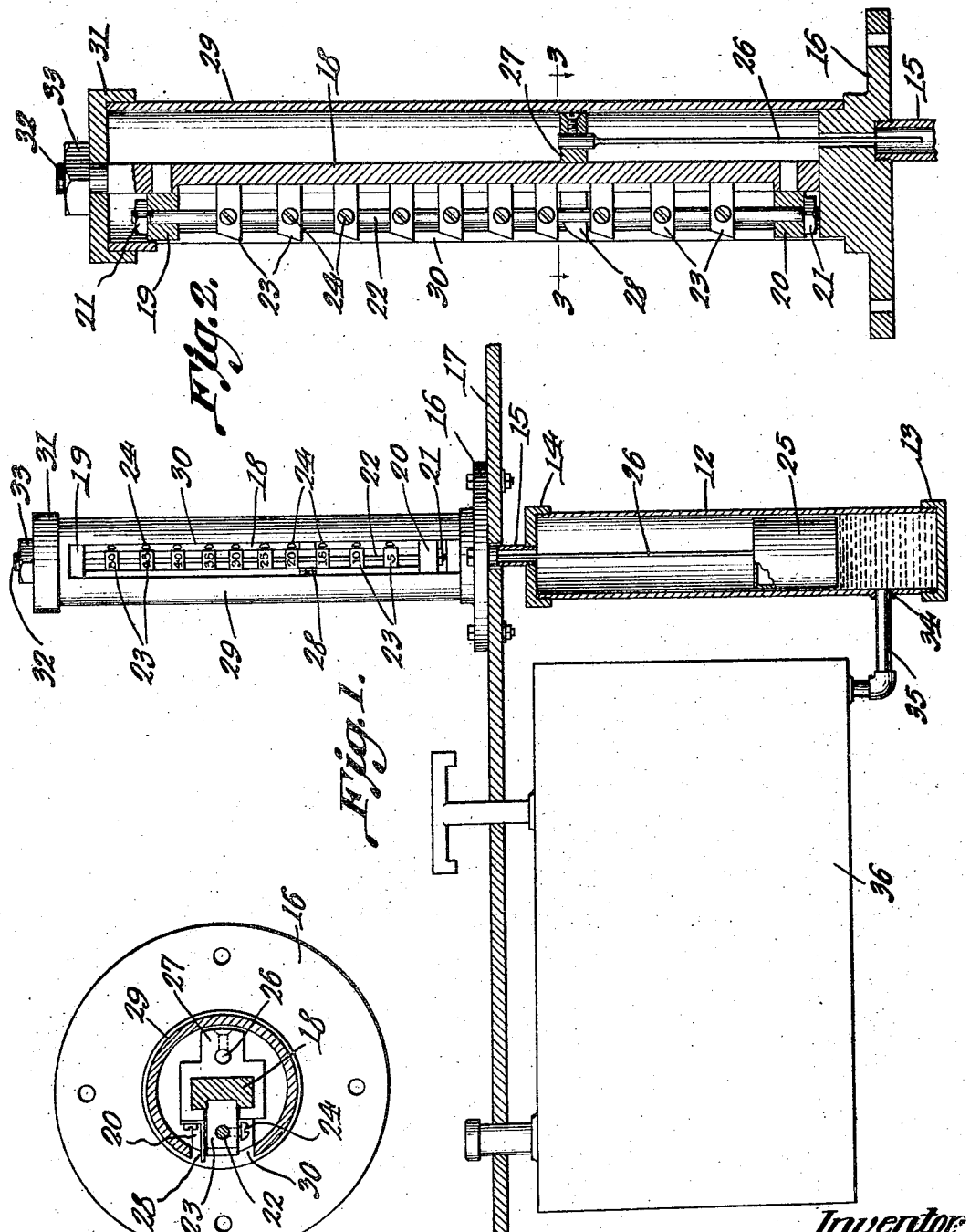

OTIS H. AVERS, OF CATTARAUGUS, NEW YORK.

FLOAT GAUGE.

1,414,927. Specification of Letters Patent. Patented May 2, 1922.

Application filed December 18, 1920. Serial No. 431,610.

*To all whom it may concern:*

Be it known that I, OTIS H. AVERS, a citizen of the United States, residing at Cattaraugus, in the county of Cattaraugus and State of New York, have invented or discovered certain new and useful Improvements in Float Gauges, of which the following is a specification, reference being had therein to the accompanying drawings.

This invention has for its object to provide a measuring float-controlled gauge for liquids which is of such construction that it is adapted for use in connection with tanks of different sizes and shapes, and which comprises adjustable graduation members which may be set so as to indicate, in co-operation with a float-controlled index, the quantity of liquid in any tank, of whatever size or shape, in connection with which the gauge is to be employed, as will hereinafter more fully appear.

In the accompanying drawings Fig. 1 is a sectional elevation showing the improved gauge mounted on a floor or support beneath which the liquid-containing tank is located. Fig. 2 is a vertical sectional view of the gauge taken at right angles to the gauge as represented in Fig. 1. Fig. 3 is a detail section on line 3—3, Fig. 2.

Referring to the drawings, 12 denotes a vessel, preferably in the form of a cylinder, having a bottom cap 13 and a top cap 14 screwed or otherwise suitably attached thereto. Secured to the top cap 14 is a pipe 15 which is preferably screw threaded at its upper end for connection with a sustaining plate or disk 16 which may be attached to a floor or other suitable support 17. Mounted on the plate or disk 16 is a bar 18 provided with top and bottom lugs 19 and 20. Supported by the said lugs, and preferably secured in place by nuts 21, is a scale rod 22 to which are adjustably secured a series of graduation members 23, said members being preferably attached to said rod by set screws 24.

Loosely fitting in the vessel 12 is a float 25 herein shown as consisting of a closed hollow cylinder, and attached to said float is a wire or rod 26 extending up through the tube 15 and the support 16 and having attached to its upper end a block 27 adapted to slide up and down on the bar 18 which serves as a guide therefor, the said block being provided with an index member 28 co-operating with the graduation members 23.

The scale device and its supporting bar 18 are preferably housed within a removable cylindrical casing 29 having a front opening 30 through which the graduation members and the index may be seen. Mounted at the top of said casing is a cap 31 and the bar 18 is provided at its top with a threaded stud 32 extending through an opening in the top of said cap 31, the said cap and casing 29 being held in place by a nut 33 screwed onto the said threaded stud.

The cylinder 12 is provided near its bottom with an opening 34 into which may be screwed a pipe 35 communicating with a tank 36 adapted to hold gasoline or other liquid.

In the use of the improved measuring gauge a quantity of gasoline or other liquid, say five gallons, may be poured, into the tank 36 and the lowermost graduation member 23 will then be attached to the scale rod 26 at the point denoted by the index 28 which will be moved upward to a certain position by the float 25 with which the said index is connected. A given additional quantity of liquid, say five gallons, will then be poured into the tank 36, and the next graduation member 23 will be set accordingly, as indicated by the index now lifted further upward by the increased quantity of liquid in the tank, and the other graduation members will then be set to their proper positions on the scale rod 26 as the tank is filled. If the tank is of very great size, or of great horizontal capacity, of course the graduation members will be placed nearer together on the scale rod 26; and if the tank is of lesser size, or lesser horizontal capacity, they will be placed further apart. Thus the float-controlled index will at all times indicate the quantity of liquid which may be contained in the tank 36 and if a quantity of said liquid be withdrawn from the said tank, as by a gasoline pump, the amount so withdrawn will be indicated by the float-controlled index working in connection with the graduated scale. Thus if a person be buying a given quantity of gasoline pumped from the tank the quantity withdrawn will be visually indicated by the float-controlled index working in connection with the scale with the adjustable graduation members thereon, so that the purchaser may see for himself if he is obtaining full measure.

The improved gauge may be installed in any suitable position in connection with a tank the contents of which are to be measured and indicated by the visible graduation scale, as by being installed in or near an office, and at a greater or lesser distance from the tank the contents of which are to be measured and indicated; or the scale may be mounted directly on the tank containing the liquid to be measured. If used in connection with a very large tank a different scale from that herein shown and having a plurality of sets of adjustable graduation members may be employed. The invention is therefore not to be understood as being limited to the particular construction shown, but may be embodied in different forms from that herein shown without departing from the spirit of the invention.

Having thus described my invention I claim and desire to secure by Letters Patent:—

1. In a measuring and indicating gauge, the combination with a float-controlled index, of a series of adjustably mounted graduation members with which the said index co-operates.

2. A measuring and indicating gauge comprising the combination with a vessel adapted for the admission thereto of liquid, of a float loosely mounted in said vessel, a rod attached to said float and extending upward from said vessel, an index connected with the upper part of said rod, a scale rod, and a series of graduation members adjustably attached to said scale rod and with which the said index co-operates.

3. In a float controlled gauge, the combination with a vessel adapted for the admission of liquid thereto, of a float loosely mounted in said vessel, a wire or rod attached to said float and extending upward from said vessel, an index connected with the upper part of said rod or wire, a block by which said index is carried, a guide bar on which said block may move freely up and down, a scale rod connected with said guide bar and provided with a series of scale members which are adjustably attached to said rod.

4. In a float-controlled gauge, the combination with a vessel adapted for the admission of liquid thereto, of a float loosely mounted in said vessel, a wire or rod attached to said float and extending upward from said vessel, an index connected with the upper part of said rod or wire, a block by which said index is carried, a guide bar on which said block may move freely up and down, a scale rod connected with said guide bar and provided with a series of scale members which are adjustably attached to said rod, a casing having an opening through which the said scale members and index may be seen, a sustaining member by which the gauge may be maintained in place, and means for attaching said casing to said sustaining member.

5. In a float-controlled gauge, the combination with a vessel adapted for the admission of liquid thereto, of a float loosely mounted in said vessel, a wire or rod attached to said float and extending upward from said vessel, an index connected with the upper part of said rod or wire, a block by which said index is carried, a guide bar on which said block may move freely up and down, a scale rod connected with said guide bar and provided with a series of scale members which are adjustably attached to said rod, a casing having an opening through which the said scale members and index may be seen, a sustaining member by which the gauge may be maintained in place, and means for attaching said casing to said sustaining member, said means comprising a cap on said casing, a threaded stud on the top of said guide bar and a nut fitted to said threaded stud.

In testimony whereof I affix my signature.

OTIS H. AVERS.